US005875267A

United States Patent [19]
Djakovic

[11] Patent Number: 5,875,267
[45] Date of Patent: *Feb. 23, 1999

[54] FAST DIGITAL IMAGE SHARPENING METHOD AND STRUCTURE

[75] Inventor: Vladan Djakovic, San Jose, Calif.

[73] Assignee: Integrated Device Technology, Inc., Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 531,999

[22] Filed: Aug. 21, 1995

[51] Int. Cl.[6] .......... G06K 9/40

[52] U.S. Cl. .......... 382/263; 382/266

[58] Field of Search .......... 382/262, 263, 382/264, 266, 132, 199, 267; 358/447

[56] References Cited

U.S. PATENT DOCUMENTS

| | | | |
|---|---|---|---|
| 5,351,305 | 9/1994 | Wood et al. | 382/266 |
| 5,442,462 | 8/1995 | Guissin | 358/463 |

OTHER PUBLICATIONS

Rafael C. Gonzalez and Richard E. Woods, *Digital Image Processing*, pp. 189–201, Addison–Wesley Publishing Company 1993.

Anil K. Jain, Fundamentals of Digital Image Processing, *Image Enchancement*, pp. 233–266, Prentice–Hall Inc. 1989.

Rhys Lewis, Practical Digital Image Processing, pp. 73–92 and 117–147, Ellis Horwood Limited 1990.

*Primary Examiner*—Yon J. Couso
*Attorney, Agent, or Firm*—Skjerven, Morrill, MacPherson, Franklin & Friel

[57] ABSTRACT

An initial digital image is blurred to form a blurred image which is subtracted from the initial image in order to form a sharpened version of the initial image. Unidirectional blurs provide for blurring the initial image, wherein the value of each pixel in the blurred image depends on the values of all the pixels in the original image. One blurring method involves the performance of four unidirectional blurs: a left-right blur, a right-left blur, a top-down blur and a bottom-up blur. In one embodiment, the first three of the above unidirectional blurs are intermingled, thereby resulting in superior access to the image data, i.e. in greater availability of the accessed image data from a cache.

6 Claims, 5 Drawing Sheets

FAST DIGITAL IMAGE SHARPENING METHOD AND STRUCTURE

BACKGROUND OF THE INVENTION

1. Field of the Invention

The present invention relates to digital image processing and, in particular, to unsharp masking techniques for crispening edges.

2. Discussion of the Related Art

Images are sometimes displayed or printed on an output device (e.g. printer, terminal etc) using closely spaced dots, each such dot referred to as a "pixel". Such images, known as digital images, are typically stored in a storage device (such as a conventional computer memory) as a sequence of binary integers, where each integer is a sequence of zeroes and ones (such as the sequence "01101101") and specifies for a corresponding pixel one of a fixed number of intensities at which the pixel is to be displayed. For example, if each integer is allocated 8 bits, then one of 256 intensities can be specified.

Several image enhancement techniques have been developed to accentuate, or sharpen, various features of digital images such as edges and boundaries. One such technique, known as unsharp masking, is commonly used in the printing industry to crispen edges (i.e. to enhance the contrast between the dark and light areas which define an edge). The process of unsharp masking typically comprises the following three steps:

1) Blurring the original image, thereby removing high frequency components of the original image.
2) Subtracting the blurred image from the original image, thereby creating a differential image in which low frequency components of the original image have been subtracted out. This provides enhanced contrast on the dark-light transitional area (edges) and, thus, gives the impression of enhanced sharpness.
3) Adding some real multiple, $\lambda$, of the differential image to the original image. The choice of $\lambda$ reflects a tradeoff between the goal of removing low frequency image components in order to enhance edges (favored by a large value for $\lambda$) and the goal of preserving the resemblance between the original image and the final sharpened image (favored by a small value for $\lambda$). The preferred value for $\lambda$ is application specific and, thus, the setting of $\lambda$ is typically under user control.

This process of unsharp masking can, thus, be described by the equation $$V=U+\lambda(U-B),$$

where U represents the original unsharpened image, B represents a blurred version of image U, V represents the final sharpened image and $\lambda$ is greater than zero. The most time consuming step in the above unsharp masking process is that of producing a blurred image.

Neighborhood operations are often used to form the blurred image, required for unsharp masking, from the original unsharpened image. A neighborhood operation computes the value for a pixel in the blurred image from the values of the pixel and some (e.g. the eight closest) neighboring pixels in the original unsharpened image. For example, the neighborhood averaging method computes the value for a pixel in the blurred image by averaging the values in the original image of that pixel and of some neighboring pixels.

While neighborhood operations using a small neighborhood may efficiently compute a blurred image, such blurring methods possess the undesirable property of computing the value for each pixel in the blurred image only on the basis of the values of a few of the pixels in the original unsharpened image. As a result, the edge crispening achieved in the final sharpened image may not be satisfactory.

One solution to this problem involves the use of a larger neighborhood. For example, a Gaussian smoothing filter could be used (as described, for example, at pages 127–8 in Lewis, R. (1990) *Practical Digital Image Processing,* Ellis Horwood). One possible blurring method using a Gaussian filter computes a value for each pixel in the blurred image from a weighted sum of the values of some or all the pixels in the original image. The weight applied to a particular pixel value in the original image in calculating the value of a pixel in a blurred image is given by the quantity $Ae^{-(r^2/2\sigma^2)}$, where A and $\sigma$ are constants and r is the distance between the particular pixel and the pixel whose value in the blurred image is being computed.

Unfortunately, neighborhood operations using a large neighborhood (such as the Gaussian technique described above) may require excessive computation. What is needed is an efficient method for blurring (preferably whose computation time is linear in the number of pixels in the original image) where the value of each pixel of the blurred image depends on the value of every pixel in the original unsharpened image and the quality of the blurred image is of adequate quality, at least for the purposes of sharpening.

SUMMARY

An initial digital image is blurred to form a blurred image which is subtracted from the initial image in order to form a sharpened version of the initial image. A fast method uses what are called unidirectional blurs for blurring the initial image, wherein the value of each pixel in the blurred image depends on the values of all the pixels in the original image.

One blurring method in accordance with this invention comprises:

1) performing a left-right blur on the initial digital image to produce a second digital image;

2) performing a right-left blur on the initial digital image to produce a third digital image;

3) averaging the second and third digital images to produce a fourth digital image;

4) performing a top-down blur on the fourth digital image to produce a fifth digital image;

5) performing a bottom-up blur on the fourth digital image to produce a sixth digital image; and 6) averaging the fifth and sixth digital images to produce the final blurred image;

In one embodiment, steps 1–4 of the above method are intermingled (as are steps 5 and 6). In other words, steps 1–4 are applied to each row of the image before being applied to subsequent rows of the image. The intermingling of the unidirectional blurring steps 1, 2 and 4 results in superior access to the image data, i.e. in greater availability of accessed image data from a cache.

DETAILED DESCRIPTION

Figure 1:
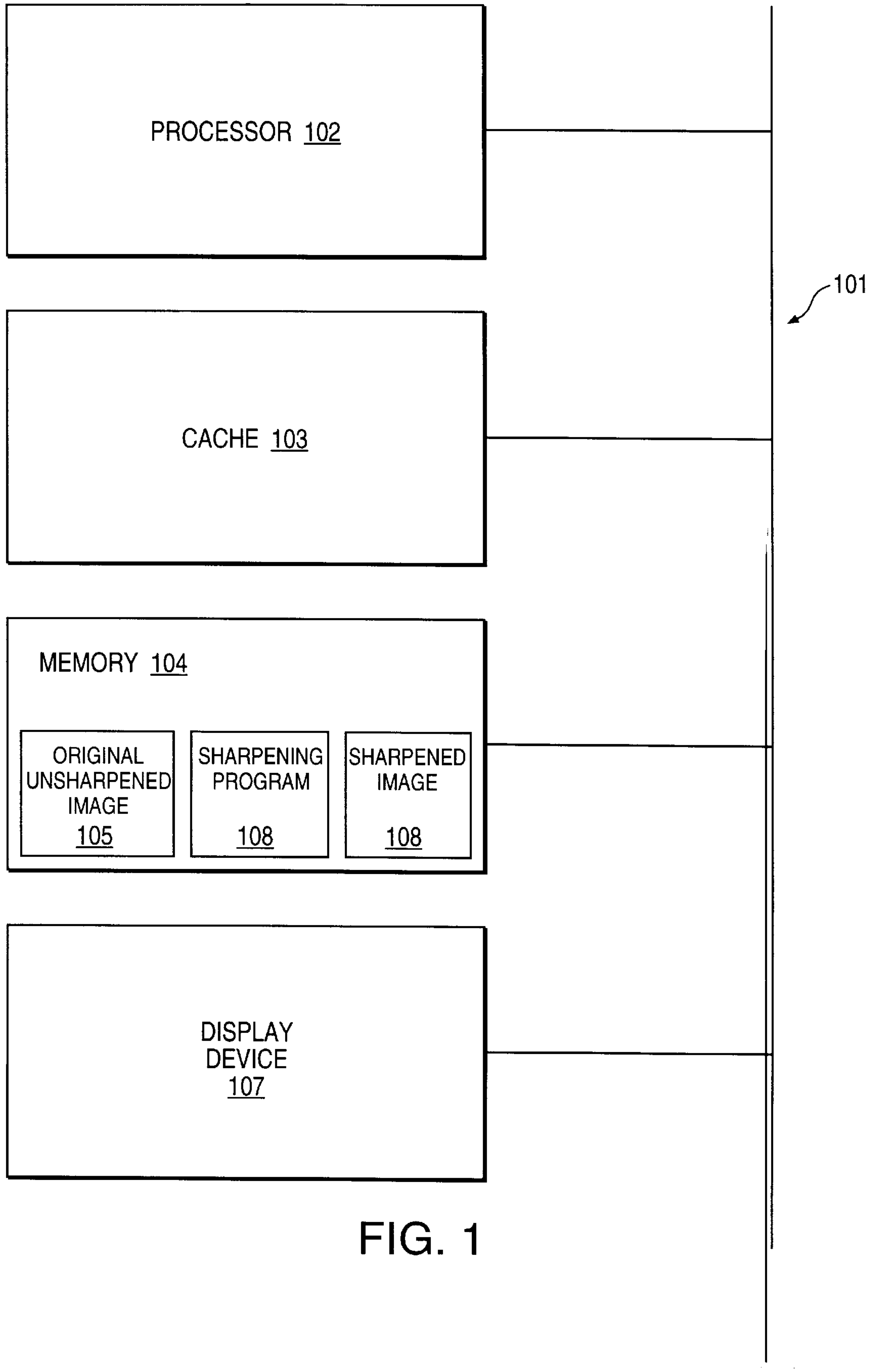
FIG. 1 depicts a structure, in accordance with one embodiment of the invention, for carrying out the methods illustrated by the flowcharts of FIGS. 2–5.

FIG. 1 depicts one possible environment for carrying out the methods for unsharp masking in accordance with this invention. A processor 102, a cache 103, a memory 104 and a display device 107 are each coupled to a bus 101. Display device 107 could be a printer, monitor or any other device capable of rendering a digital image.

Memory 104 stores a digital image 105, whose sharpening is desired. Processor 102 performs (according to the instructions in sharpening program 108 stored in memory 104) the computations required to carry out unsharp masking in accordance with this invention and stores a sharpened digital image 106 in memory 104. (In another embodiment, the above computations are performed by an application specific integrated circuit instead of by processor 102.) Display device 107 displays sharpened image 105.

While carrying out unsharp masking in accordance with this invention, processor 102 attempts to retrieve elements of image 105 and elements of one or more intermediate images from cache 103. If the required data is not present in the cache then processor 102 retrieves the required data from memory 104 and at the same time places the data into cache 103. In addition, processor 102 computes elements of intermediate images, and stores these elements in cache 103.

The techniques for unsharp masking, disclosed herein, involve unidirectional blurs and, in particular, four types of unidirectional blurs: left-right, right-left, top-down and bottom-up blurs.

In a left-right blur, each row of a blurred image V is produced from the corresponding row in an original image U by computing the value of a pixel in the blurred image as the weighted average of the value of the pixel in the original image and the value of the neighboring pixel to the left in the blurred image. Given that the left most pixel does not have a left neighbor, its value in the blurred image remains unchanged from its value in the original image. The computation of values in the blurred image for the pixels in a row begins at the left most pixel and proceeds to the right most pixel. This order of computation causes the value of a particular pixel in a row of the blurred image to depend on the original values of the particular pixel and of the pixels to the left of the particular pixel in the same row. (Clearly, the order in which the various rows of an image are blurred left-right is immaterial, in terms of the final blurred image produced.)

A left-right blurring operation of an image U (having M+1 rows and N+1 columns) to produce an image V of equal size could be performed in the manner illustrated by the following pseudocode, where $u_{i,j}$ and $v_{i,j}$ denote the values of the pixel in the ith row and jth column of images U and V, respectively, and where f is a real number denoting a weighting factor:

```
for i = 0 to M                  /* blur ith row of image U left
                                   to right */
begin
    V_i,o := u_i,o;    /* initizlize value for
                          left most pixel in row i */
    for j = 1 to N
        /*  compute the value in the blurred image V
            for the pixel in the ith row and
            jth column as a weighted average of the
            value of the pixel in the original image U
            and the already computed value of the
            neighboring pixel to the left in the
            blurred image V. The weights applied to
            the former and latter values are 1/(1+f)
            and f/(1+f), respectively */
        v_i,j := (u_i,j + f*v_i,j-1)/(1+f);
end;
```

For example, when M=N=2 (i.e. a 3×3 image), the execution of the above pseudocode for performing a left-right blur would result in the computation of the values of the pixels of the blurred image, V, in the following order:

```
v_0,0 := u_0,0                          /* left-right
v_0,1 := (u_0,1 + fv_0,0)/(1 + f)          blur of
v_0,2 := (u_0,2 + fv_0,1)/(1 + f)          row 0 */
v_1,0 := u_1,0                          /* left-right
v_1,1 := (u_1,1 + fv_1,0)/(1 + f)          blur of
v_1,2 := (u_1,2 + fv_1,1)/(1 + f)          row 1 */
v_2,0 := u_2,0                          /* left-right
v_2,1 := (u_2,1 + fv_2,0)/(1 + f)          blur of
v_2,2 := (u_2,2 + fv_2,1)/(1 + f)          row 2 */
```

In a right-left blur, each row of a blurred image V is produced from the corresponding row in an original image U by computing the value of a pixel in the blurred image as the weighted average of the value of the pixel in the original image and the value of the neighboring pixel to the right in the blurred image. Given that the right most pixel does not have a right neighbor, its value in the blurred image remains unchanged from its value in the original image. The computation of values in the blurred image for the pixels in a row begins at the right most pixel and proceeds to the left most pixel. This order of computation causes the value of a particular pixel in a row of the blurred image to depend on the original values of the particular pixel and of the pixels to the right of the particular pixel in the same row. (Clearly, the order in which the various rows of an image are blurred right-left is immaterial, in terms of the final blurred image produced.)

A right-left blurring operation of an image U (having M+1 rows and N+1 columns) to produce an image V of equal size can be performed in the manner illustrated by the following pseudocode, where $u_{i,j}$ and $v_{i,j}$ denote the values of the pixel in the ith row and jth column of images U and V, respectively, and where f is a real number denoting a weighting factor:

```
for i = 0 to M          /* blur ith row of image U right
                           to left */
begin
    v_i,N := u_i,N;    /* initialize value for
                          right most pixel in row i */
    for j = N-1 down to 0
        /*  compute the value in the blurred image v
            for the pixel in the ith row and
            jth column as a weighted average of the
            value of the pixel in the original image U
            and the already computed value of the
            neighboring pixel to the right in the
            blurred image V. The weights applied to
            the former and latter values are 1/(1+f)
            and f/(1+f), respectively */
        v_i,j := (u_i,j + f*v_i,j+1)/(1+f);
end;
```

For example, when M=N=2 (i.e. a 3×3 image), the execution of the above pseudocode for performing a right-left blur would result in the computation of the values of the pixels of the blurred image, V, in the following order:

| | |
|---|---|
| $v_{0,2}:= u_{0,2}$ | /* right-left |
| $v_{0,1}:= (u_{0,1} + fv_{0,2})/(1 + f)$ | blur of |
| $v_{0,0}:= (u_{0,0} + fv_{0,1})/(1 + f)$ | row 0 */ |
| $v_{1,2}:= u_{1,2}$ | /* right-left |
| $v_{1,1}:= (u_{1,1} + fv_{1,2})/(1 + f)$ | blur of |
| $v_{1,0}:= (u_{1,0} + fv_{1,1})/(1 + f)$ | row 1 */ |
| $v_{2,2}:= u_{2,2}$ | /* right-left |
| $v_{2,1}:= (u_{2,1} + fv_{2,2})/(1 + f)$ | blur of |
| $v_{2,0}:= (u_{2,0} + fv_{2,1})/(1 + f)$ | row 2 */ |

In a top-down blur, each column of a blurred image V is produced from the corresponding column in an original image U by computing the value of a pixel in the blurred image as the weighted average of the value of the pixel in the original image and the value of the neighboring pixel above in the blurred image. Given that the topmost pixel does not have a neighbor above, its value in the blurred image remains unchanged from its value in the original image.

The computation of values in the blurred image for the pixels in a column begins at the top pixel and proceeds to the bottom pixel. This order of computation causes the value of a particular pixel in a column of the blurred image to depend on the original values of the particular pixel and of the pixels above the particular pixel in the same column. (Clearly, the order in which the various columns of an image are blurred top-down is immaterial, in terms of the final blurred image produced.)

A top-down blurring operation of an image U (having M+1 rows and N+1 columns) to produce an image V of equal size can be performed in the manner illustrated by the following pseudocode, where $u_{i,j}$ and $v_{i,j}$ denote the values of the pixel in the ith row and jth column of images U and V, respectively, and where f is a real number denoting a weighting factor:

```
for j = 0 to N               /* blur jth column of image U
                                top to bottom */
begin
    v_{0,j} := u_{0,j};      /* initialize value for
                                top pixel in column j */
    for i = 1 to M
        /*  compute the value in the blurred image v
            for the pixel in the ith row and
            jth column as a weighted average of the
            value of the pixel in the original image U
            and the already computed value of the
            pixel above in the blurred image V. The
            weights applied to the former and latter
            values are 1/(1+f) and f/(1+f),
            respectively */
        v_{i,j} := (u_{i,j} + f*v_{i-1,j})/(1+f);
end;
```

For example, when M=N=2 (i.e. a 3×3 image), the execution of the above pseudocode for performing a top-down blur would result in the computation of the values of the pixels of the blurred image, V, in the following order:

| | |
|---|---|
| $v_{0,0}:= u_{0,0}$ | /* top-down |
| $v_{1,0}:= (u_{1,0} + fv_{0,0})/(1 + f)$ | blur of |
| $v_{2,0}:= (u_{2,0} + fv_{1,0})/(1 + f)$ | column 0 */ |
| $v_{0,1}:= u_{0,1}$ | /* top-down |
| $v_{1,1}:= (u_{1,1} + fv_{0,1})/(1 + f)$ | blur of |
| $v_{2,1}:= (u_{2,1} + fv_{1,1})/(1 + f)$ | column 1 */ |
| $v_{0,2}:= u_{0,2}$ | /* top-down |
| $v_{1,2}:= (u_{1,2} + fv_{0,2})/(1 + f)$ | blur of |
| $v_{2,2}:= (u_{2,2} + fv_{1,2})/(1 + f)$ | column 2 */ |

In a bottom-up blur, each column of a blurred image V is produced from the corresponding column in an original image U by computing the value of a pixel in the blurred image as the weighted average of the value of the pixel in the original image and the value of the neighboring pixel below in the blurred image. Given that the bottom pixel does not have a neighbor below, its value in the blurred image remains unchanged from its value in the original image. The computation of values in the blurred image for the pixels in a column begins at the bottom pixel and proceeds to the top pixel. This order of computation causes the value of a particular pixel in a column of the blurred image to depend on the original values of the particular pixel and of the pixels below the particular pixel in the same column. (Clearly, the order in which the various columns of an image are blurred bottom-up is immaterial, in terms of the final blurred image produced.)

A bottom-up blurring operation of an image U (having M+1 rows and N+1 columns) to produce an image V of equal size can be performed in the manner illustrated by the following pseudocode, where $u_{i,j}$ and $v_{i,j}$ denote the values of the pixel in the ith row and jth column of images U and V, respectively, and where f is a real number denoting a weighting factor:

```
for j = 0 to N               /* blur jth column of image U
                                bottom to top */
begin
    v_{M,j} := u_{M,j};      /* initialize value for
                                bottom pixel in column j */
    for i = M-1 down to 0
        /*  compute the value in the blurred image v
            for the pixel in the ith row and
            jth column as a weighted average of the
            value of the pixel in the original image U
            and the already computed value of the
            pixel below in the blurred image V. The
            weights applied to the former and latter
            values are 1/(1+f) and f/(1+f),
            respectively */
        v_{i,j} := (u_{i,j} + f*v_{i+1,j})/(1+f);
end;
```

For example, when M=N=2 (i.e. a 3×3 image), the execution of the above pseudocode for performing a bottom-up blur would result in the computation of the values of the pixels of the blurred image, V, in the following order:

| | |
|---|---|
| $v_{2,0}:= u_{2,0}$ | /* bottom-up |
| $v_{1,0}:= (u_{1,0} + fv_{2,0})/(1 + f)$ | blur of |
| $v_{0,0}:= (u_{0,0} + fv_{1,0})/(1 + f)$ | column 0 */ |
| $v_{2,1}:= u_{2,1}$ | /* bottom-up |
| $v_{1,1}:= (u_{1,1} + fv_{2,1})/(1 + f)$ | blur of |
| $v_{0,1}:= (u_{0,1} + fv_{1,1})/(1 + f)$ | column 1 */ |
| $v_{2,2}:= u_{2,2}$ | /* bottom-up |
| $v_{1,2}:= (u_{1,2} + fv_{2,2})/(1 + f)$ | blur of |
| $v_{0,2}:= (u_{0,2} + fv_{1,2})/(1 + f)$ | column 2 */ |

Figure 2:
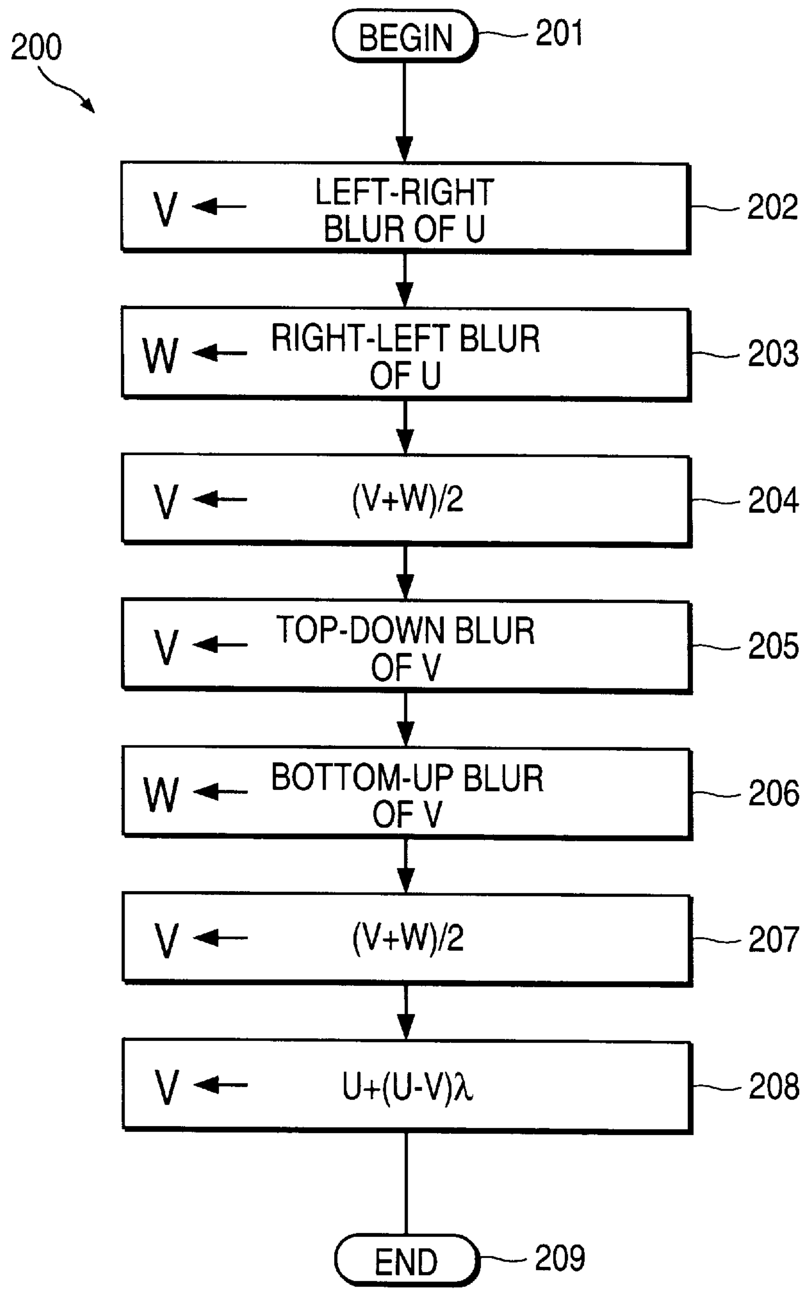
FIG. 2 is a flowchart for carrying out unsharp masking in accordance with one embodiment of the invention.

An example of an unsharp masking technique, using unidirectional blurs, in accordance with the invention is illustrated by flow chart 200 of FIG. 2. Processing begins in step 201. From step 201 processing transfers to step 202 where the original image U is blurred left-right, the resulting image being stored in V. Processing transfers from step 202 to step 203. In step 203, the original image U is blurred right-left, the resulting image being stored in W. From step 203 processing transfers to step 204.

In step 204, the images stored in V and W, respectively, are averaged and the resulting image stored in V. From step 204 processing transfers to step 205, where the image stored in V in step 204 is blurred top-down with the resulting image being stored in V. From step 205 processing transfers to step 206, where the image stored in V in step 205 is blurred bottom up, the resulting image being stored as image W. From step 206 processing transfers to step 207, in which the images stored in V and W, respectively, are averaged, the resulting image being stored in V. From step 207 processing transfers to step 208. In step 208 the final blurred image V, produced in step 207, is subtracted from the original image U and multiplied by a factor λ. (In a preferred embodiment, λ is a power of two, thereby enabling multiplication by λ to be performed in one cycle on processors supporting a multi-bit shift in one cycle.) This product is then added to the original image U to yield the final sharpened image V. From step 208 processing transfers to step 209 where processing according to flow chart 200 terminates.

The technique illustrated by FIG. 2 has the desirable properties of producing a blurred image in which the value of each pixel is affected by the values of all the pixels in the original image, and of having a computational time that is linear in the number of pixels.

Figure 3:
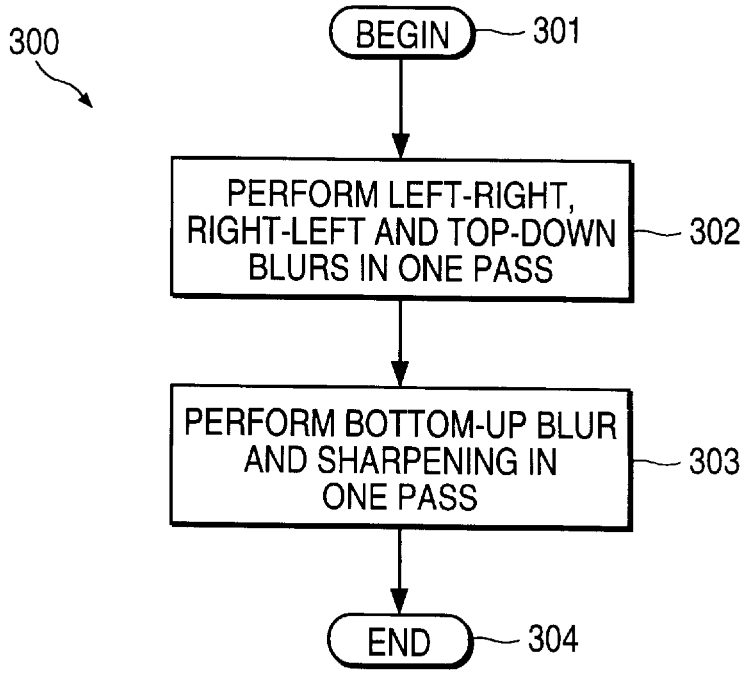
FIG. 3 is a flowchart for carrying out unsharp masking in two passes of the image, in accordance with one embodiment of the invention.
Figure 4:
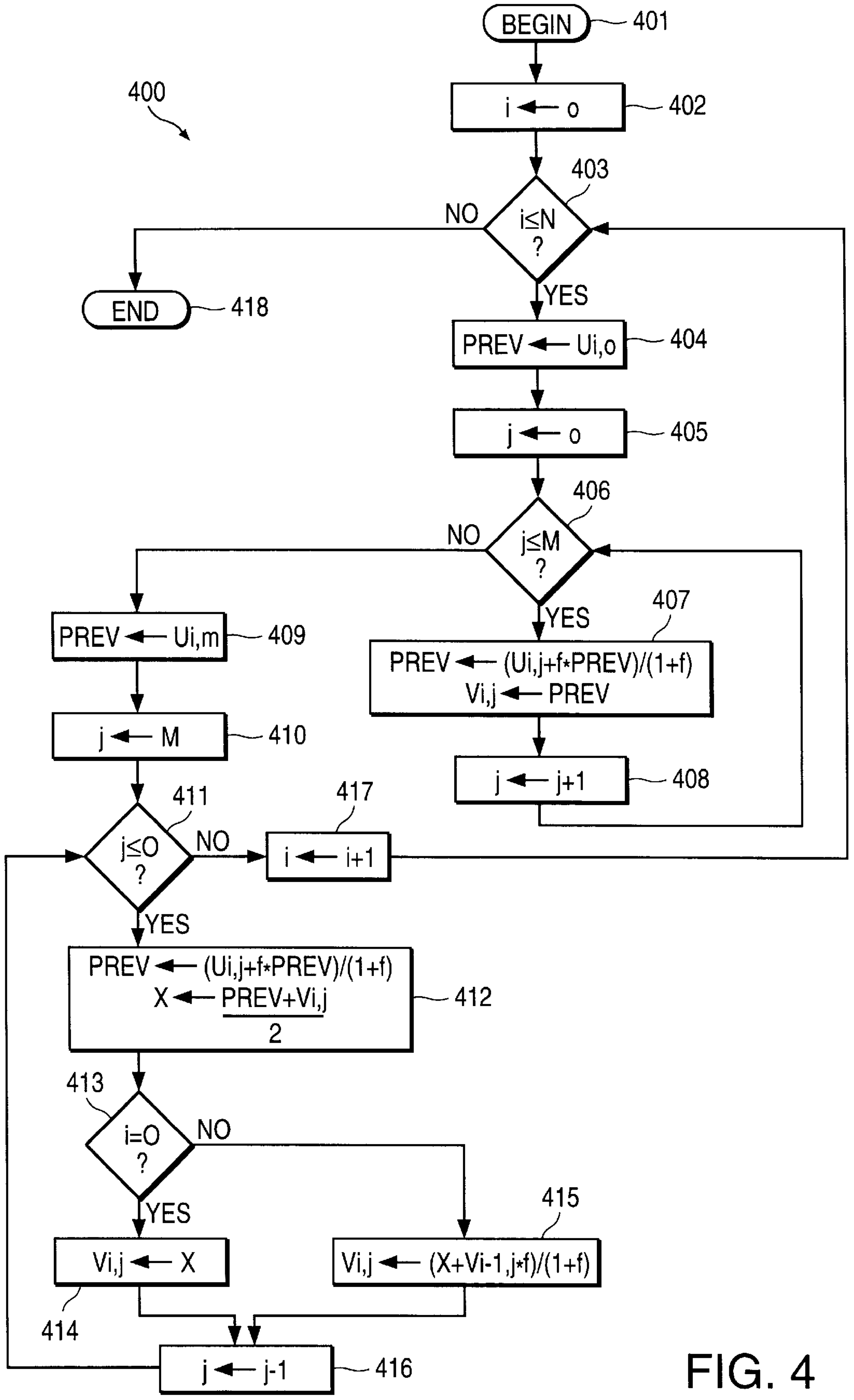
FIG. 4 is a flowchart for carrying out step 302 of FIG. 3, in one embodiment of the invention.
Figure 5:
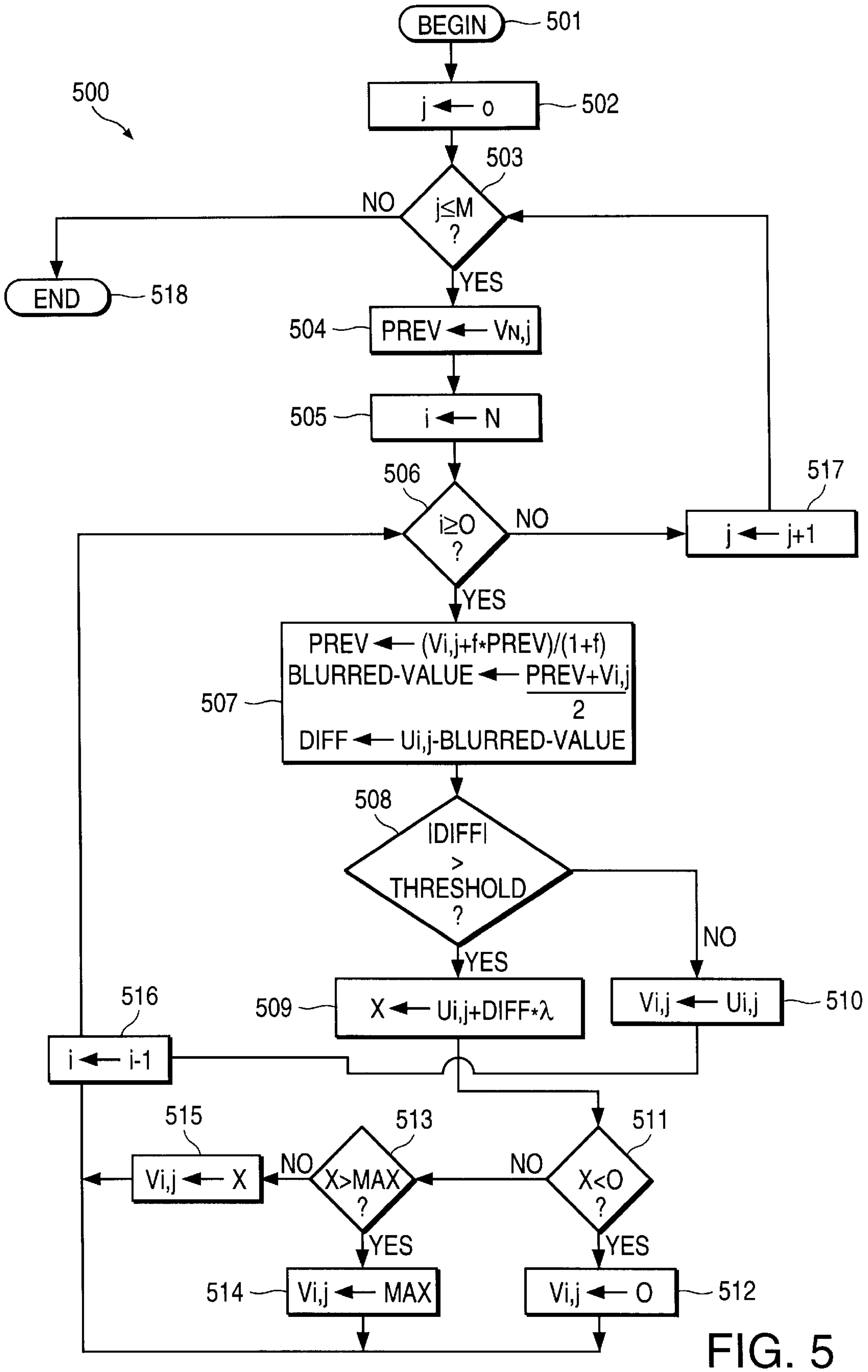
FIG. 5 is a flowchart for carrying out step 303 of FIG. 3, in one embodiment of the invention.

An equivalent technique (in terms of the final blurred image produced) to that depicted by FIG. 2 is illustrated by FIGS. 3 through 5. FIG. 3 provides an overview of the equivalent technique, and FIGS. 4 and 5 illustrate in more detail respective steps of FIG. 3. The technique of FIG. 3 involves the same unidirectional blurring steps as the technique of FIG. 2 but, instead of performing one unidirectional blur on the entire image before starting another unidirectional blur, it intermingles various blurring steps while making a pass through the image. The intermingling of blurring steps results in superior access to the image data, i.e. in greater availability of the required image data from cache 103 as opposed to memory 104, as explained below in more detail. The greater availability of image data from cache 103 reduces the number of (more time consuming) accesses to memory 104 and thereby reduces the computational time required to create the blurred image.

The input to the method illustrated by the flowchart of FIG. 3 is an unsharpened image, U, whose size is N+1 pixels by M+1 pixels (i.e. U has rows 0 through N and columns 0 through M). The output of the method is a sharpened image V of the same size as U. $u_{i,j}$ and $v_{i,j}$ denote the values for the pixel in the ith row and jth column of images U and V, respectively.

Processing according to flow chart 300 of FIG. 3 begins in step 301. From step 301 processing transfers to step 302. In step 302 each row (starting with the first row) is blurred left-right, right-left, and top-down before the next row is processed. When all rows have been so processed, processing transfers from step 302 to step 303. In step 303 the image resulting after step 302 is blurred bottom-up, column by column, starting with the first column and the final sharpened image is simultaneously produced column by column, starting with the first column. From step 303 processing transfers to step 304, where processing according to flow chart 300 terminates. Steps 302 and 303 are illustrated in more detail by flowcharts 400 (FIG. 4) and 500 (FIG. 5), respectively. Pseudocode summarizing the methods depicted in FIGS. 4 and 5 is provided below:

Pseudocode for flowchart 400 (FIG. 4)

```
for each row going top to bottom (i=0 to N):
 begin
  v_{i,o} := u_{i,o}
  going from left to right (j=1 to M):
  begin
   v_{i,j} := (u_{i,j} + f*v_{i,j-1})/(1+f)
  end
  prev := u_{i,M}
  going from right to left (j = M down to 0)
  begin
   prev := (u_{i,j} + f*prev)/(1+f)
   if i=0 then v_{i,j} := (prev + v_{i,j})/2
    else v_{i,j} := ((prev + v_{i,j})/2 + f*v_{1-
1,j})/(1+f)
   end
  end
```

Pseudocode for flowchart 500 (FIG. 5)

```
for each col going from left ro right (j=0 to M):
  begin
    prev := v_{N,j}
    going from bottom to top (i=N down to 0):
    begin
      prev := (v_{i,j} + f*prev)/(1+f)
      diff := u_{i,j - (prev + vi,j)/2}
      if |diff| > threshold then
      begin
        x := u_{i,j} + λ*diff
        clip x to [0,255] range (assuming 8 bits per pixel)
        v_{i,j} := x
      end
        else v_{i,j} = u_{i,j}
end
```

Processing according to flow chart 400 (which depicts step 302 of FIG. 3 in more detail) begins in step 401. From step 401 processing transfers to step 402, where a variable i, indicating the row currently being processed, is initialized to zero. Processing transfers from step 402 to decision step 403. The purpose of step 403 is to determine whether or not all rows of the image have been processed according to flowchart 400. If variable i is not less than or equal to constant N (i.e. if all rows of the image have been processed according to flowchart 400), then processing transfers from step 403 to step 418, where processing according to flow chart 400 terminates. Otherwise, processing transfers from step 403 to step 404, where variable "prev" is initialized to $u_{i,o}$, thereby setting the boundary condition for the left-right blur of the ith row about to be performed in M+1 iterations of step 407.

Processing transfers from step 404 to step 405, where variable j, indicating the column of the particular pixel currently being computed, is initialized to zero. This completes step 405. Processing transfers from step 405 to decision step 406. The purpose of step 406 is to determine whether or not all pixels of the current row i have been blurred left-right in step 407. If variable j is not less than or equal to constant M (i.e. if all pixels of the current row i have been blurred left-right through M+1 iterations of step 407, described below) then processing transfers from decision step 406 to step 409, in order to commence the right-left blur of the current row i.

Otherwise (i.e. not all pixels of the current row i have been blurred left-right), processing transfers from decision step 406 to step 407, where the currently processed pixel is blurred left-right. In step 407, variable prev is assigned the quantity $(u_{i,j}$+f*prev)/(1+f) (i.e. the value for the currently processed pixel, resulting from a left-right blur of the original image) and then $v_{i,j}$ is assigned the value of variable prev. From step 407 processing transfers to step 408, where variable j is incremented by one. From step 408 processing transfers to decision step 406 described above.

Through M+1 iterations of steps 406–8, row i of the original image U is blurred left-right. After the last iteration, processing transfers from decision step 406 to step 409. In step 409, variable prev is assigned $u_{i,M}$, thereby setting the boundary condition for the right-left blur of the ith row about to be performed in M+1 iterations of step 412. Processing transfers from step 409 to step 410 where variable j, indicating the column of the pixel in row i currently being processed, is assigned constant M. Processing transfers from step 410 to decision step 411. The purpose of step 411 is to determine whether or not all pixels of the current row i have been blurred right-left and top-down in steps 412–415. If variable j is not greater than or equal to zero (i.e. all pixels of the current row i have been blurred right-left and top-down in steps 412–415) then processing transfers from step 411 to step 417, where variable i (indicating the currently processed image row) is incremented by 1. Processing transfers from step 417 to decision step 403 described above, at which point the processing of the next row begins.

If variable j is greater than or equal to zero (i.e. not all pixels of the current row i have been blurred right-left and top-down in steps 412–415) then processing transfers from decision step 411 to step 412. In step 412 the variable prev is assigned the value $(u_{i,j}+f*prev)/(1+f)$ and variable x is assigned the value $(prev+v_{i,j})/2$. Thus, after step 412 variable prev holds the value for the currently processed pixel resulting from a right-left blur of the original image, U, and variable x holds the average of the values for the currently processed pixel resulting from left-right and right-left blurs, respectively, of the original image, U.

Processing transfers from step 412 to decision step 413. If variable i is equal to zero then the currently processed pixel is from row 0 and, therefore, has no neighbor above. In this case, the value of the currently processed pixel in row 0 will not change during a top-down blur and, thus, processing transfers from decision step 413 to step 414, where the value of the currently processed pixel, $v_{i,j}$, is assigned the value of variable x previously computed for the pixel in step 412. As described above, the computed value of x is the average of the values for the currently processed pixel resulting from left-right and right-left blurs, respectively, of the original image, U.

If, on the other hand, variable i is not equal to zero, then the currently processed pixel is not from row 0 and, thus, has a neighbor above. In this case, processing transfers from decision step 413 to step 415 where a top-down blur for the currently processed pixel is performed by assigning $v_{i,j}$ a weighted average of x and $v_{i-1,j}$ given by the quantity $(x+v_{i-1,j}*f)/(1+f)$. At this point, as described above, x holds the value of the currently processed pixel in an image that is the average of the images that are formed by blurring the original image left-right and right-left, respectively. $v_{i-1,j}$ holds the (previously computed) value for the pixel above the currently processed pixel in the image V produced as a result of applying the method of FIG. 4. Thus, after step 415 is performed, $v_{i,j}$ holds the value for the currently processed pixel resulting from a top-down blur of the image that is the average of the images resulting from left-right and right-left blurs, respectively, of the original image. Processing transfers from both steps 414 and 415 to step 416, where variable j is decremented by 1. Processing transfers from step 416 to decision step 411 described above.

In summary, a row of the image constructed by the flowchart of FIG. 4, is formed by M+1 iterations of step 407, followed by M+1 iterations of steps 412 and 415 (steps 412 and 414 for row 0). In other words, the steps of blurring left-right, right-left and top-down are intermingled: all three blurs are performed on one row before beginning the blurring of the next row. As discussed above, the intermingling of blurring steps may result in a superior pattern of accesses to the image data (i.e. a pattern of access resulting in greater availability of image data from cache 103), thereby avoiding more time consuming access to memory 104.

In particular, if cache 103 is large enough to hold 2 rows of the original image, U, and two rows of the output image, V, then the elements of U and V required for steps 412 and 415 should be available from cache 103. The values of U and V for a particular row that are required for the M+1 executions of step 412 (carrying out the right-left blur for the row) should be available in cache 103 after the M+1 executions of step 407 (previously carrying out the left-right blur for the same row) have been performed.

Furthermore, the values of V from the row above that of the particular row that are required for the M+1 executions of step 415 (carrying out the top-down blur for the row) should be available in cache 103 after the (previous) execution of the method of FIG. 4 for the row above. Thus, accesses to memory 104, that would be otherwise required (in a method where the executions of the various unidirectional blurs are not intermingled, e.g. the method of FIG. 2) for the right-left and top-down blurs, may be avoided.

Processing according to flow chart 500 (which depicts step 303 of FIG. 3 in more detail) begins in step 501. From step 501 processing transfers to step 502, where variable j, indicating the image column currently being processed, is initialized to zero. From step 502 processing transfers to decision step 503. The purpose of step 503 is to determine whether or not all columns have been processed according to flowchart 500. If variable j is greater than constant M then all columns have been processed and processing transfers from decision step 503 to step 518, where processing according to flow chart 500 terminates. If variable j is not greater than constant M, processing transfers from decision step 503 to step 504, where the variable prev is assigned $v_{N,j}$, thereby setting the boundary condition for the bottom-up blur of the jth column about to be performed in step 507. From step 504 processing transfers to step 505, where variable i, indicating the row of the particular pixel being computed, is initialized to N.

Processing transfers to decision step 506 from step 505. The purpose of step 506 is to determine whether or not all pixels in the current column have been processed according to flowchart 500. If variable i is less than zero (i.e. all pixels in the current column have been processed according to flowchart 500), processing transfers from decision step 506 to step 517, where variable j is incremented by one. Processing transfers from step 517 to decision step 503, described above, where the processing of the next column begins. If variable i is not less than zero (i.e. not all pixels in the current column have been processed according to flowchart 500), then processing transfers from decision step 506 to step 507. In step 507, variable prev is assigned the quantity $(v_{i,j}+f*prev)/(1+f)$, which is the value for the currently processed pixel resulting from a bottom-up blur of the image created in step 302 of FIG. 3 (i.e. the image created by executing flowchart 400 (FIG. 4) on the original image). Also in step 507, the variable "blurred_value" is assigned $(prev+v_{i,j})/2$, and thereby holds the value for the currently processed pixel in the image formed by averaging the image formed as a result of step 302 and the image formed by blurring bottom-up the former image. Because the averaging operation performed in step 507 for a given pixel occurs immediately after the bottom-up blurring operation performed in step 507 for that pixel, the value of $v_{i,j}$ required for the averaging operation should be available from cache 503. Finally, in step 507, variable diff is assigned the value of $u_{i,j}$—blurred_value and thereby holds the value for the currently processed pixel in the original image minus the value for the currently processed pixel in the final blurred image.

From step 507 processing transfers to decision step 508. The purpose of step 508 is to determine whether or not the absolute value of the difference between the values for the currently processed pixel in the final blurred and original images, respectively, exceeds the constant "threshold". If the absolute value of the difference between the original and final blurred images for the currently processed pixel does not exceed the threshold, the value for the pixel in the final sharpened image is left at its value in the original image. The use of a threshold thereby avoids the amplification of noise present in the original image. The preferred value for the threshold is application specific (e.g. depending on the amount of noise present in the image to be sharpened) and, thus, is typically under user control.

If the absolute value of variable diff (which holds the above difference) is greater than the constant "threshold", then processing transfers from decision step 508 to step 509. In step 509, variable x is assigned $u_{i,j}$+diff*$\lambda$ which is the unclipped value for the currently processed pixel in the final sharpened image. (In a preferred embodiment, $\lambda$ is a power of two, thereby enabling multiplication by $\lambda$ to be performed in one cycle on processors supporting a multi-bit shift in one cycle.) If the absolute value of variable diff is not greater than threshold, then processing transfers from decision step 508 to step 510, where $v_{i,j}$ is assigned $u_{i,j}$, i.e. the value for the currently processed pixel in the final sharpened image is left at its value in the original image. Processing transfers from step 510 to step 516.

Processing transfers from step 509 to decision step 511. The purpose of step 511 is to determine if the value computed (in step 509) for the currently processed pixel in the sharpened image is less than zero. If variable x is less than zero then processing transfers from decision step 511 to step 512, where $v_{i,j}$ is assigned zero. If variable x is not less than zero, then processing transfers from decision step 511 to decision step 513. The purpose of step 513 is to determine if the value computed (in step 509) for the currently processed pixel in the sharpened image is more than the constant "max" (where max=$2^k-1$ and k is the number of bits used to represent each pixel value). If variable x is greater than "max" then processing transfers from decision step 513 to step 514, where $v_{i,j}$ is assigned the constant max. If x is not greater than the constant max, then processing transfers from decision 513 to step 515, where $v_{i,j}$ is assigned the variable x. Thus, the purpose of steps 511–514 is to clip the value computed in step 509 for the current pixel in the final sharpened image to the allowable value space of [0,max]. Processing transfers from steps 512, 514 and 515 to step 516, where i (indicating the row of the current pixel) is decremented by one. Processing transfers from step 516 to decision step 506, described above, where the computation of the value in the final sharpened image for the next pixel in the current column begins.

In a preferred embodiment, the weighting factor f used in blurring steps 407, 412, 415 and 507 is equal to $2^k-1$ for some integer k, thereby allowing the division by the quantity 1+f to be performed in one cycle as a k-bit shift on processors supporting a one-cycle multibit shift. The multiplication by f, also required in each of the above steps, can be performed in two cycles, i.e. as a k-bit shift followed by a subtraction. The amount of blurring increases with increasing values of f. The preferred value for f is application specific and is, thus, typically under user control. For example, the amount of blurring desired, and hence the value of f selected, would typically increase with increasing dimensions (in terms of pixels) of the object(s) of interest in the image to be sharpened.

Depending on the application at hand and, in particular, what is known about the orientation of edges in the image (e.g. in a bar code application all edges may be vertical) one or more of the unidirectional blurs performed in the above disclosed unsharp masking method may not be necessary. In addition, in some applications one or more unidirectional blurs that do not proceed left to right, right to left, top to bottom or bottom to top, could be employed. One such blur could be a unidirectional blur, wherein the blurring is performed in the direction of one of the diagonals of the image.

This disclosure contains material subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Appendix 1, which is a part of this application and herein incorporated by reference in its entirety, includes computer source code written in the C computer programming language for carrying out sharpening of a digital image in accordance with the present invention.

This disclosure is illustrative and not limiting; further modifications will be apparent to one skilled in the art and are intended to fall within the scope of the appended claims.

APPENDIX 1

Copyright 1994, Integrated Device Technology, Inc.

```
/* Copyright 1994 by Vladan Djakovic, Integrated Device
Technology, Inc. This is unpublished proprietary code. All rights
reserved. */
/* This module interfaces Photoshop's USM plugin via OracCom
Communication system. */
#include <stdio.h>
#include <math.h>
#include "dispatch.h"
char *p1, *p2;
unsigned int aa, mm;
int progres, o_prog;
static struct prm {
    long semaphore;
    long status;
    long overlap;
    long r_hei;
    long r_hiplane;
    long treshold;
    unsigned char *r_srcPtr;
    unsigned char *r_dstPtr;
    long r_coun;
    long r_jxx;
    long r_nb;
    long rowbytes;
    long rowbytes_o;
    long blurr;
    long r_bc[4];
    long r_fc[4];
    } params;
static volatile struct prm *ppo;
static int pstat, ovlp, padd, padd_o; blurrr;
static unsigned char *blend = NULL;
static int allb, allb_o;
static unsigned char *bbi = NULL, *bbo = NULL, *bbfin = NULL;
```

-continued

APPENDIX 1

Copyright 1994, Integrated Device Technology, Inc.

```
usm(paddr)
unsigned int *paddr;
{
      int loopcnt,hei, oval,jj, vlins, inplane, coun, count, jxx,
jamt, nb, plane;
      int stepp, radius, ix, iy, numvals, dist, faq, maxdist,
shiftamt;
      unsigned char *vptr, *srcPtr, *dstrec, *dstPtr, *srcPtr1,
*recpts, *recptd, *recpts1, *recptfin, ttt;
      unsigned int tot, tot__o;
      unsigned char *cp1, *cp2;
      int bc[4], fc[4], jx1, jx2;
      double logs;
      if(xread(&params, paddr, sizeof(params)) != sizeof(params)) {
            perror(" Read failed 7");
            return(res__PANIC);
            }
      ppo = &params;
      pstat = ppo->status; /* should be 0 */
      if (pstat == 2) { /* closing time */
            if(bbo != NULL) {free(bbo); bbo = NULL; }
            if(bbi != NULL) {free(bbi); bbi = NULL; }
            if(bbfin != NULL) {free(bbfin); bbfin = NULL; }
            if(blend != NULL) {free(blend); blend = NULL; }
            return(1);
            }
      srcPtr = ppo->r__srcPtr; /* source image area */
      srcPtr = (unsigned char *) ((unsigned int)srcPtr + MAC__MAP);
      dstPtr = ppo->r__dstPtr; /* destination image area */
      dstPtr = (unsigned char *) ((unsigned int)dstPtr + MAC__MAP);
      dstrec = dstPtr:
      vlins = ppo->r__hei;
      inplane=ppo->r__hiplane;
      coun = ppo->r coun;
      jxx = ppo->r__jxx & 0xff; /* radius of unsharpening
(exponential) */
      jamt = ppo->r__jxx >> 8; /* amount of unsharpening (%) */
      logs = log(((double) (jamt)) / 100.0 ) / log(2.0);
      shiftamt = logs;
      if(shiftamt < 0) shiftamt = -shiftamt;
      nb = ppo->r__nb;
      hei = vlins;
      stepp = inplane + 1;
      maxdist = 0;
      tot = nb * hei;
      tot__o = nb * hei;
      blurrr = ppo->blurr; /* 0 - sharpen. 1 - blur only */
/*
            vlins = number of lines in current buffer (image can be
bigger.
            inplane = number of color planes-1 (RGB inplane = 2)
            coun = width (pixels per line = number of columns)
            nb = total number of bytes in line = coun * (inplane +
1)
            Data is interleaved.
*/
            padd = 0;
            padd__o = 0;
      if(ppo->rowbytes != nb) {
            padd = ppo->rowbytes - nb;
            tot__o = ppo->rowbytes * hei;
            }
      if(ppo->rowbytes__o != nb) {
            padd__o = ppo->rowbytes__o - nb;
            tot__o = ppo->rowbytes__o * hei;
            }
      if(pstat == 0) { /* first time */
            if(bbi != NULL) {free(bbi); bbi = NULL; }
            if((bbi=malloc(tot)) == NULL) {
                  fprintf("Out of memory\n");
                  return(res__PANIC);
                  }
            if(bbo != NULL) {free(bbo); bbo = NULL; }
            if((bbo=malloc(tot)) == NULL) {
                  fprintf("Out of memory\n");
                  return(res__PANIC);
                  }
            if(bbfin != NULL) {free(bbfin); bbfin = NULL; }
            if((bbfin=malloc(tot__o)) == NULL) {
                  fprintf("Out of memory\n");
                  return(res__PANIC);
                  }
            }
      if(xread(bbi, srcPtr, tot) != tot) {
            perror("Read failed 8");
            return(res__PANIC);
            }
      if(pstat == 0) { /* first time */
            if(blend != NULL) {free(blend); blend = NULL; }
            blend = malloc(nb);
            if(blend == NULL) {
                  fprintf("Out of memory\n");
                  return (res__PANIC);
                  }
            memcpy(blend, bbi, nb);
            }
      o__prog = 0;
      recpts = bbi;
      recpts1=recptd = bbo;
      for (vlins=0; vlins < ppo->r__hei; vlins++ ) {/* horiz.loop -
by lines */
            int oinval, intervalue, inval1;
            srcPtr =recpts;
            dstPtr =recptd;
            vptr =recpts1 + nb - stepp;
            for (plane = 0; plane <= inplane; plane++,
srcPtr=recpts+plane, dstPtr=recptd+plane, vptr = recpts1+plane
+nb-stepp) {
                              /* loop on planes within line */
                  oinval = *(srcPtr);
                  for (count = 0; count < coun; count++) {
                              /* loop on pixels within plane */
                        oinval = (*srcPtr + (oinval<<jxx)-oinval) >>
jxx;
                        *dstPtr = oinval;
                        srcPtr += stepp; dstPtr += stepp;
                        }
                  srcPtr -= stepp; dstPtr -= stepp;
                  oinval = *(srcPtr);
                  for(count = coun; count > 0; count--) {
                              /* loop on pixels within plane */
                        oinval = (*srcPtr + (oinval<<jxx)-oinval) >>
jxx;
                        intervalue = (*dstPtr + oinval) >> 1;
                        inval1 = *vptr;
                        *dstPtr = (intervalue + (inval1<<jxx)-inval1)
>> jxx;
                        srcPtr -= stepp; dstPtr -= stepp, vptr -=
stepp;
                        }
                  }
            recpts1 = recptd;
            recpts += nb + padd;
            recptd += nb + padd;
            }
/* vertical scan start */
      allb = (ppo->r__hei - 1) * (nb+padd);
      allb__o = (ppo->r hei - 1) * (nb+padd__o);
      recpts1 = bbi;
      recpts = bbo;
      recptfin = bbfin;
      for (count = 0; count < coun; count++) { /* main loop - by
columns */
            int oinval= 0, intervalue=0;
            srcPtr =recpts + stepp * count;
            srcPtr1 =recpts1 + stepp * count;
            dstPtr = recptfin + stepp * count;
            for (plane = 0; plane <= inplane; plane++,
srcPtr=recpts+plane + stepp * count, srcPtr1=recpts1+plane + stepp
* count, dstPtr= recptfin+plane + stepp * count) {
                              /* loop on planes within column */
                  int ii, ii1;
                  srcPtr1 += allb;-
                  srcPtr += allb;
```

-continued

APPENDIX 1
Copyright 1994, Integrated Device Technology, Inc.

```
            dstPtr += allb_o;
            oinval = *srcPtr;
            for (vlins=0; vlins < ppo->r_hei; vlins++ ) {
                    /* loop on pixels within plane */
                oinval = (*srcPtr + (oinval<<jxx)−oinval) >>
jxx;
                intervalue = (*srcPtr + oinval) >> 1;
                if(!blurrr) {
                    ii = *srcPtr1;
                    ii1 = ii − intervalue;
                    if(ii1 > params.treshold || ii1 < (-
params.treshold)) {
                        if(jamt == 100)
                            intervalue = ii + iil;
                        else if(jamt > 100)
                            intervalue = ii + (iil >>
shiftamt);
                        else
                            intervalue = ii + (iii >>
shiftamt);
                        if(intervalue < 0) intervalue = 0;
                        else if(intervalue > 255) intervalue
= 255;
                        *dstPtr = intervalue;
                        }
                    else *dstPtr = ii;
                    }
                else {
                    *dstPtr = intervalue;
                }
                srcPtr −= nb+padd; srcPtr1 −= nb+padd;
                dstPtr −= nb+padd_o;
                }
            }
        }
/* vertical scan end */
}
```

I claim:

1. A method of sharpening a first digital image, comprising:

blurring the first digital image to produce a second digital image, wherein blurring the first digital image comprises performing operations on pixel values representing the first digital image, to complete one or more unidirectional blurs, wherein blurring comprises:

performing a left-right blur on the first digital image to produce a third digital image;

performing a right-left blur on the first digital image to produce a fourth digital image;

averaging the third and fourth digital images to produce a fifth digital image;

performing a top-down blur on the fifth digital image to produce a sixth digital image;

performing a bottom-up blur on the fifth digital image to produce a seventh digital image; and averaging the sixth and seventh digital images to produce the second digital image; and subtracting pixel values representing the second digital image from the pixel values representing the first digital image to produce a differential image, wherein operations performed on the pixel values for performing a left-right blur, performing a right-left blur, averaging the third and fourth digital images, and performing a top-down blur, are intermingled, and wherein operations performed on the pixel values for performing a bottom-up blur, averaging the sixth and seventh digital images, and subtracting the second digital image from the first digital image, are intermingled.

2. The method of claim 1, further comprising the step of adding a multiple of the differential image to the first image.

3. A program storage device readable by a machine and encoding a program of instructions for executing the method of claim 1.

4. A program storage device readable by a machine and encoding a program of instructions for executing the method of claim 2.

5. A method for sharpening a first digital image, comprising:

executing a first processing pass that sequentially processes pixel values from a first array that represents the first digital image to produce a second digital image, wherein executing the processing pass comprises:

performing a first series of unidirectional blurs, the first series of unidirectional blurs being in a first direction along lines in a first series of lines of pixel values in the first array;

performing a second series of unidirectional blurs, the second series of unidirectional blurs being in a second direction along the lines in the first series, wherein the second direction is opposite the first;

performing a third series of unidirectional blurs, the third series of unidirectional blurs being in a third direction along lines in a second series of lines; and combining results of the first, second, and third series of unidirectional blurs to generate a second array of pixel values; and executing a second processing pass that sequentially processes pixel values from the second array, wherein executing the second processing pass comprises:

performing a fourth series of unidirectional blurs, the fourth series of blurs being in a fourth direction along the lines in the second series; and combining results tom the fourth series of unidirectional blurs with the pixel values in the first array to generate a sharpened image.

6. The method of claim 5, wherein the lines in the first series are rows and the lines in the second series are columns.

* * * * *